(12) United States Patent
Hwang et al.

(10) Patent No.: US 9,188,711 B2
(45) Date of Patent: Nov. 17, 2015

(54) LIGHT GUIDE PLATE AND LIGHT-EMITTING ASSEMBLY HAVING THE SAME

(75) Inventors: Seong-Yong Hwang, Asan-si (KR); Jin-Sung Choi, Cheonan-si (KR); Dae-Young Joung, Seoul (KR); Tae-Ho Lee, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 389 days.

(21) Appl. No.: 13/193,226

(22) Filed: Jul. 28, 2011

(65) Prior Publication Data

US 2012/0176812 A1    Jul. 12, 2012

(30) Foreign Application Priority Data

Jan. 10, 2011    (KR) .................. 10-2011-0002100

(51) Int. Cl.
*F21V 7/04* (2006.01)
*G02B 5/02* (2006.01)

(52) U.S. Cl.
CPC ............ *G02B 5/0221* (2013.01); *G02B 5/0278* (2013.01)

(58) Field of Classification Search
CPC .............. G02B 5/0278; G02B 5/0221; G02B 1/133615; G02B 6/0055; G02B 6/0065
USPC ......................................... 362/600–634, 97.1
See application file for complete search history.

(56) References Cited

U.S. PATENT DOCUMENTS

| | | | | |
|---|---|---|---|---|
| 7,287,894 B2* | 10/2007 | Chen | ............................ | 362/621 |
| 7,839,474 B2* | 11/2010 | Kameshima et al. | ......... | 349/137 |
| 2008/0268234 A1* | 10/2008 | Yu | ................................. | 428/327 |
| 2010/0271840 A1* | 10/2010 | Hamada et al. | ............... | 362/606 |

FOREIGN PATENT DOCUMENTS

| | | |
|---|---|---|
| JP | 09-159837 | 6/1997 |
| JP | 2000-206524 | 7/2000 |
| KR | 1020060046929 | 5/2006 |

OTHER PUBLICATIONS

English Abstract for Publication No. 09-159837.
English Abstract for Publication No. 2000-206524.
English Abstract for Publication No. 1020060046929.

* cited by examiner

*Primary Examiner* — Anh Mai
*Assistant Examiner* — Jessica M Apenteng
(74) *Attorney, Agent, or Firm* — F. Chau & Associates, LLC

(57) ABSTRACT

A light guide plate includes a light incident surface, a light emitting surface and a light guide surface. The light incident surface receives light from an external light source. The light emitting surface emits outward the light received through the light incident surface. The light guide surface faces the light emitting surface and includes a diffusion pattern formed thereon. The diffusion pattern includes a plurality of porous particles and a plurality of spheroidal particles, and the porous particles have pores formed therein and on surfaces thereof.

19 Claims, 6 Drawing Sheets

LIGHT GUIDE PLATE AND LIGHT-EMITTING ASSEMBLY HAVING THE SAME

CROSS REFERENCE TO RELATED APPLICATIONS

This application claims priority under 35 U.S.C. §119 from Korean Patent Application No. 2011-2100, filed on Jan. 10, 2011 in the Korean Intellectual Property Office (KIPO), the contents of which are herein incorporated by reference in its entirety.

BACKGROUND

1. Technical Field

Exemplary embodiments of the present disclosure are directed to a light guide plate and a light-emitting assembly having the light guide plate. More particularly, exemplary embodiments of the present disclosure are directed to a light guide plate used for a liquid crystal display (LCD) apparatus and a light-emitting assembly having the light guide plate.

2. Description of the Related Art

In general, a light-emitting assembly providing light to an LCD panel may be classified as either an edge-illumination type or a direct-illumination type according to a position of a light source unit generating the light. In an edge-illumination type, the light-emitting assembly includes a light guide plate for efficiently guiding the light received from the light source unit to the LCD panel. The light guide plate includes a diffusion pattern to change the light path. The diffusion pattern can uniformly provide an incident light propagating through a light incident surface of the light guide plate to a light exiting surface of the light guide plate. The diffusion pattern is formed on a surface facing the light exiting surface. The diffusion pattern includes a plurality of particles for diffusing the light. Due to the optical properties of the particles, the light provided to the opposite surface may be uniformly emitted from the light exiting surface.

When a refractive index of the diffusion particles is large, light may be easily diffused by the diffusion particles, enhancing the light-diffusion properties of the particles. However, a highly diffusive particle having relatively large refractive index, such as titanium dioxide ($TiO_2$), has a high light absorption in a blue wavelength range when compared to normally diffusive particles. Thus, when a proportion of a highly diffusive particle such as titanium dioxide is increased in the diffusion pattern, brightness and brightness uniformity may be enhanced. However, a color difference may be generated due to the increase of the amount of the titanium dioxide. This color difference may be resolved by newly-developed highly diffusive particles having a relatively large refractive index with a low light absorption in the blue wavelength range. However, these highly diffusive particles are challenging to develop due to high cost and increased manufacturing time, decreasing manufacturing productivity of the light guide plate.

The thickness of the light-emitting assembly may be decreased by decreasing the size of the light source unit, reducing the number of optical sheets (or plates), or decreasing the thickness of the optical sheets (or plates). For example, the thickness of the light guide plate, which is a main contributor to the thickness of the edge-illumination type light-emitting assembly, may be decreased, and light emitting diodes (LEDs) may be used as the light source unit, to decrease a thickness of an LCD apparatus using the light-emitting assembly. However, decreasing the thickness of the light guide plate changes the light path resulting in more blue light being absorbed by the highly diffusive particles, such as titanium dioxide, increasing color differences and decreasing display quality.

SUMMARY

Exemplary embodiments of the present disclosure provide a light guide plate capable of enhancing brightness and brightness uniformity, and minimizing generation of color differences.

Exemplary embodiments of the present disclosure also provide a light-emitting assembly having the light guide plate.

According to an exemplary embodiment of the present disclosure, a light guide plate includes a light incident surface, a light emitting surface and a light guide surface. The light incident surface receives an externally generated light. The light emitting surface emits outward the light received from the light incident surface. The light guide surface faces the light emitting surface and includes a diffusion pattern. The diffusion pattern is formed on the light guide surface and includes a plurality of porous particles and a plurality of spheroidal particles. The porous particles have pores formed therein and on surfaces thereof.

In an embodiment, a weight ratio of the porous particles to the spheroidal particles may be between about 1:1 and about 9:1.

In an embodiment, a total amount of the porous particles and the spheroidal particle, with respect to a total weight of the diffusion pattern, may be between about 5% by weight and about 35% by weight. The diffusion pattern may further include a binder resin fixing the porous particles and the spheroidal particles on the light guide surface, and an amount of the binder resin with respect to a total weight of the diffusion pattern may be between about 65% by weight and about 95% by weight.

In an embodiment, the diffusion pattern may further include a plurality of diffusion particles having a hollow structure with an empty space therein. The diffusion particles may each have a plurality of pores formed on inner and outer surfaces thereof.

According to another exemplary embodiment of the present disclosure, the light guide plate includes a light incident surface, a light emitting surface and a light guide surface. The light incident surface receives light from an external light source. The light emitting surface emits outward the light received from the light incident surface. The light guide surface faces the light emitting surface and includes a diffusion pattern. The diffusion pattern is formed on the light guide surface and includes a plurality of diffusion particles each having a hollow structure with an empty space therein.

In an embodiment, the diffusion pattern may further include a plurality of spheroidal particles.

According to still another exemplary embodiment of the present disclosure, a light-emitting assembly includes a light source for generating light and a light guide plate. The light guide plate includes a light incident surface, a light emitting surface, and a light guide surface. The light guide surface faces the light emitting surface and includes a diffusion pattern formed thereon. The light incident surface receives the light from the light source. The light emitting surface emits outward the light received through the light incident surface. The diffusion pattern includes a plurality of porous particles and a plurality of spheroidal particles, and the porous particles have pores formed therein and on surfaces thereof.

In an embodiment, the light source may include light emitting diodes.

According to still another exemplary embodiment of the present disclosure, the light-emitting assembly includes a light source for generating light and a light guide plate. The light guide plate includes a light incident surface, a light emitting surface and a light guide surface. The light guide surface faces the light emitting surface and includes a diffusion pattern formed thereon. The light incident surface receives the light from the light source. The light emitting surface emits outward the light received through the light incident surface. The diffusion pattern is formed on the light guide surface and includes a plurality of diffusion particles each having a hollow structure with an empty space therein.

In an embodiment, the light source may include a plurality of light emitting diodes.

According to a present disclosure, the diffusion pattern formed on the light guide surface of the light guide plate includes silica particles, but not titanium dioxide particles, to enhance a brightness and brightness uniformity, and to minimize a generation of color differences, that may improve a display quality of a display apparatus.

DETAILED DESCRIPTION OF EXEMPLARY EMBODIMENTS

Hereinafter, exemplary embodiments of the present disclosure will be explained in detail with reference to the accompanying drawings.

Figure 1:
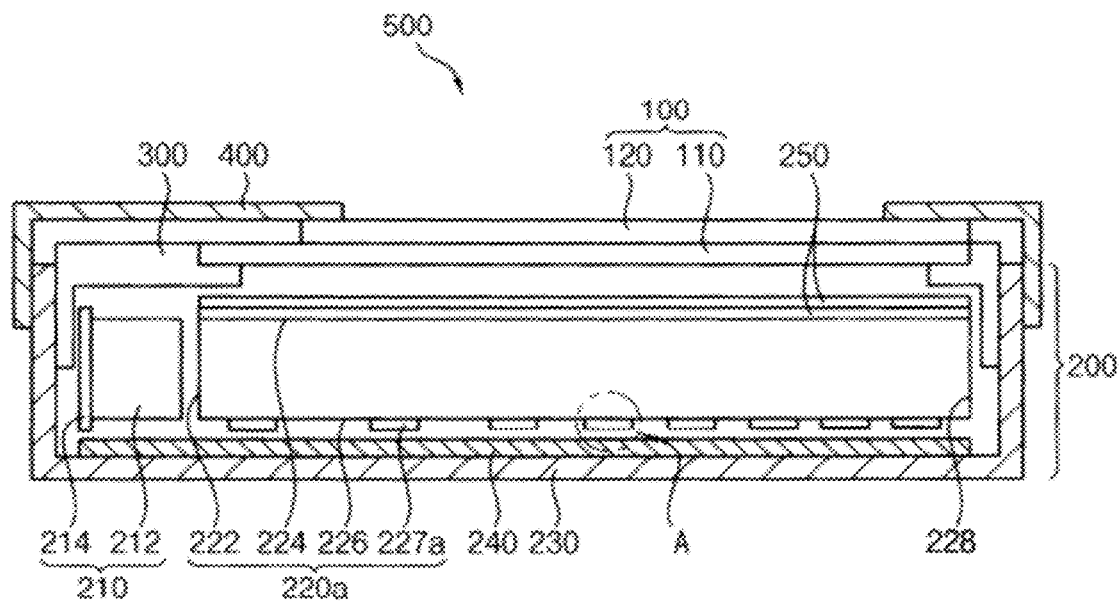
FIG. 1 is a cross-sectional view illustrating a display apparatus according to an exemplary embodiment of the present disclosure.

FIG. 1 is a cross-sectional view illustrating a display apparatus according to an exemplary embodiment of the present disclosure.

Referring to FIG. 1, a display apparatus 500 includes a display panel 100 and a light-emitting assembly 200 providing light to the display panel 100. The light-emitting assembly 200 may be disposed under the display panel 100. The display apparatus 500 may further include a mold frame 300 and a top chassis 400.

The display panel 100 displays an image using the light received from the light-emitting assembly 200. The display panel 100 may include a thin film transistor (TFT) substrate 110 including a TFT as a switching element and a pixel electrode, an opposite substrate 120 facing the TFT substrate 110, and a liquid crystal layer (not shown) interposed between the TFT substrate 110 and the opposite substrate 120. A voltage is applied to the liquid crystal layer so that liquid crystal molecules of the liquid crystal layer control a transmittance of the light passing through the TFT substrate 110. The light passing through the liquid crystal layer is emitted from the display panel 100 through the opposite substrate 120, so that the display panel 100 may display an image.

The light-emitting assembly 200 includes a light source module 210, a light guide plate 220a and a container 230 receiving the light source module 210 and the light guide plate 220a. The light-emitting assembly 200 further includes a reflecting plate 240 and an optical sheet 250.

The light source module 210 includes a light source 212 generating the light and a circuit board 214. The light source 212 is mounted on the circuit board 214. The circuit board 214 extends in one direction and a plurality of the light sources 212 are arranged in that direction on the circuit board 241.

The light source 212 includes a light emitting diode (LED) package (not shown). In an embodiment, the LED package may include an LED chip emitting blue light and a light transforming layer molding the LED chip. The light transforming layer may include a material transforming the blue light emitted from the LED chip into white light. The blue light may be partially transformed to a red light and/or a green light when passing through the light transforming layer. When the red light and/or the green light are mixed with the blue light, a viewer may see white light. Alternatively, the LED package may include a first LED chip emitting a blue light, a second LED chip emitting a red light and a third LED chip emitting a green light. The blue, red and green light respectively emitted by the first, second and third LED chips are mixed so that a viewer may see white light. When the blue, red and green light are uniformly mixed by the light source 212, whether including a single LED chip and the light transforming layer or including three LED chips, the resulting white light may lack color differences.

The light guide plate 220a guides the light received from the light source module 210 to the display panel 100. The light guide plate 220a includes a light incident surface 222, a light emitting surface 224 and a light guide surface 226 including a diffusion pattern 227a formed on the light guide surface 226. In one embodiment, the light guide plate 220a has a hexahedron structure defined by the light incident surface 222, the light emitting surface 224, the light guide surface 226, an opposite surface 228 facing the light incident surface 222, and two side surfaces.

The light incident surface 222 is a surface of the light guide plate 220a facing the light source 212. The light generated from the light source 212 propagates into the light guide plate 220a through the light incident surface 222. The light propagating through the light incident surface 222 is internally-reflected from an area adjacent to the light incident surface 222 to an area of the light guide plate 220a adjacent to the opposite surface 228, so that the incident light propagating through the light incident surface 222 is provided to the entire surface of the light emitting surface 224, even though the light source module 210 is disposed adjacent to one surface of the light guide plate 220a.

The light emitting surface 224 is connected to the light incident surface 222, the opposite surface 228 and the two side surfaces. The light propagating through the light incident surface 222 of the light guide plate 220a propagates from the inside of the light guide plate 220a to be emitted out from the light guide plate 220a through the light emitting surface 224.

The light guide surface 226 faces the light emitting surface 224. The light guide surface 226 is connected to the light incident surface 222, the opposite surface 228 and the two side surfaces. The diffusion pattern 227a may be formed on an outer surface of the light guide surface 226. The light propagating through the light incident surface 222 may be uniformly provided to the light emitting surface 224 by the diffusion pattern 227a. The light emitting surface 224 may be substantially parallel to the light guide surface 226 so that the light guide plate 220a has a hexahedron structure shown in FIG. 1. Alternatively, the light guide surface 226 may be inclined with respect to the light emitting surface 224 so that the light guide plate 220a may have a wedge structure.

A plurality of the diffusion patterns 227a are spaced apart from each other by a predetermined distance on the light guide surface 226. On the light guide surface 226, the distance between adjacent diffusion patterns 227a in a first region adjacent to the light incident surface 222 may be larger than the distance between adjacent diffusion patterns 227a in a second region adjacent to the opposite surface 228. Here, a size of each of the diffusion patterns 227a may be substantially identical. Alternatively, the size of adjacent diffusion patterns 227a in the first region may be smaller than that of the adjacent diffusion patterns 227a in the second region. Here, the number density of the diffusion patterns 227a per unit area may be substantially identical. Each diffusion pattern 227a may be dot shaped when viewed in a plan view of the diffusion patterns 227a. The diffusion pattern 227a will be illustrated referring to FIGS. 2 to 5.

The reflecting plate 240 is disposed under the light guide plate 220a facing the light guide surface 226. The reflecting plate 240 is received in the container 230 to be disposed between the light guide plate 220a and the container 230. The optical sheet 250 is disposed over the light guide plate 220a facing the light emitting surface 224. The light emitted out through the light emitting surface 224 propagates through the optical sheet 250 to be uniformly provided to the display panel 100. The optical sheet 250 may include a diffusion sheet, a prism sheet, etc.

The light guide plate 220a, the reflecting plate 240, the optical sheet 250 and the light source module 210 are stably fixed in the container 230 by the mold frame 300. The mold frame 300 may support the display panel 100. The top chassis 400 is combined with the container 230 so that the display panel 100 may be stably disposed on the light-emitting assembly 200.

Hereinafter, the diffusion pattern 227a shown in FIG. 1 will be illustrated with reference to FIGS. 2, 3, 4 and 5.

Figure 2:
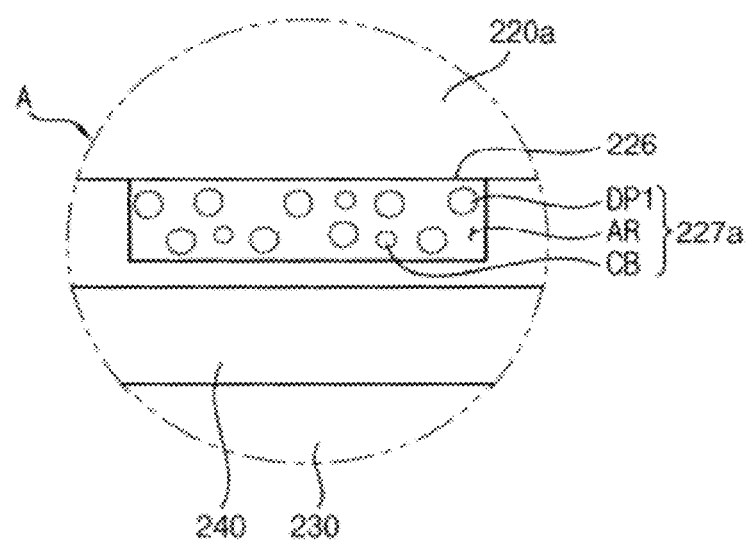
FIG. 2 is an enlarged cross-sectional view illustrating a portion "A" shown in FIG. 1.
Figure 3:
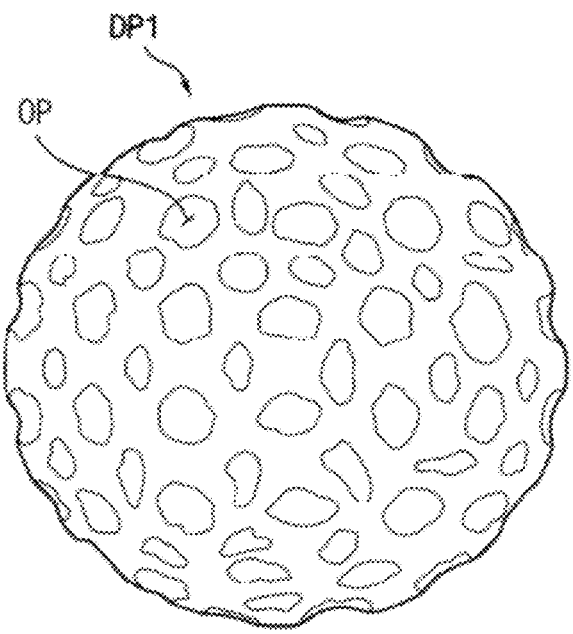
FIG. 3 is a perspective view illustrating a porous particle shown in FIG. 2.
Figure 4:
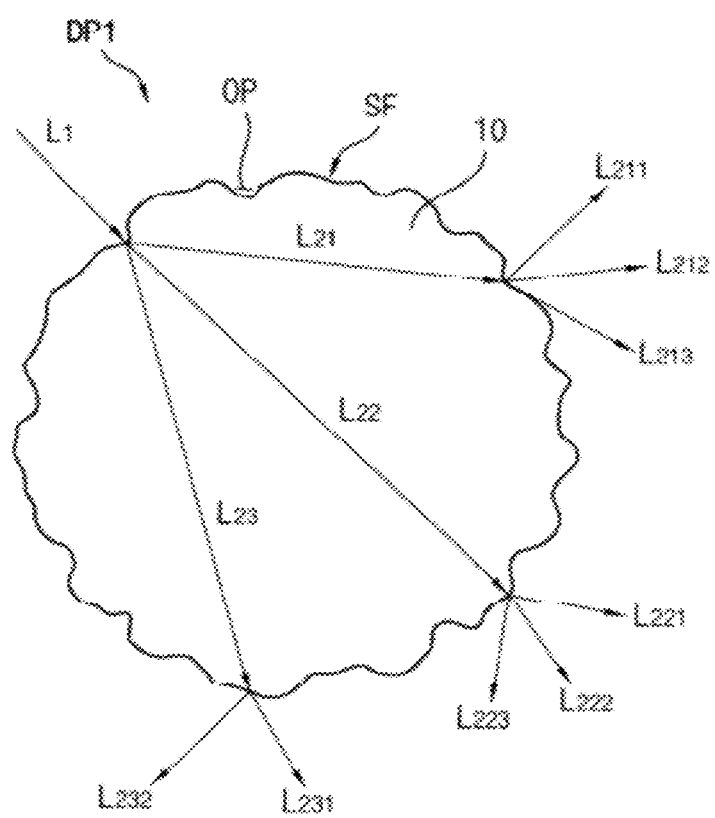
FIG. 4 is a cross-sectional view illustrating how a porous particle shown in FIG. 2 diffuses light.

FIG. 2 is an enlarged cross-sectional view illustrating a portion "A" shown in FIG. 1, and FIG. 3 is a perspective view illustrating a porous particle shown in FIG. 2. FIG. 4 is a cross-sectional view illustrating how a porous particle shown in FIG. 2 diffuses light.

Referring to FIGS. 2, 3 and 4, the diffusion pattern 227a includes porous particles DP1 and spheriodal particles CB. The diffusion pattern 227a may further include a binder resin AR.

The shape of a porous particle DP1 may be characterized by a body 10 of the porous particle DP1, and the porosity of the porous particle DP1 may be determined by a plurality of pores OP formed in the body 10. The pores OP are formed on a surface SF of the body 10 and/or inside the body 10. The pores OP may be nano sized. The body 10 has a substantially spherical shape in three-dimensions. A porous particle DP1 includes a fine embossed pattern formed on the surface SF in a cross-sectional view that is defined by the pores OP formed on the surface SF. The nano-size pores OP inside of the body 10 may not penetrate the body 10. The porous particles DP1 are formed from silica ($SiO_2$). In some embodiments, the body 10 of the porous particles DP1 may have an average diameter between about 1 µm and about 5 µm. In other embodiments, the body 10 of the porous particles DP1 may have the average diameter between about 2 µm and about 4 µm.

The spheroidal particles CB are formed from silica. In some embodiments, the spheroidal particles CB may have an average diameter between about 1 µm and about 5 µm. In other embodiments, the spheroidal particles CB may have an average diameter between about 2 µm and about 4 µm. The spheroidal particles CB may be non-porous. The spheroidal particles CB may have a substantially spherical shape having a single curvature or an ellipsoidal shape having elliptically shaped cross-sectional view. The light incident on a spheroidal particle CB is refracted into the spheroidal particle CB by a first portion of a surface of the spheroidal particle CB. The light propagating through the spheroidal particle CB is reflected out of the spheroidal particle CB by a second portion different from the first portion of the surface of the spheroidal particle CB. While the light incident to the first portion of the spheroidal particle CB may be assumed to have propagated along a single straight ray, the light emitted out of spheroidal particle CB may be propagating along a path different from that of the light incident to the first portion of the spheroidal particle CB. The light received from the light source module 210 has a plurality of light paths. Thus, the light received from the light source module 210 propagates through the first portion of the spheroidal particle CB to be emitted in various directions based to the light path of the incident light, due to the curvature of the incident surface of the first portion of the spheroidal particle CB. Based on the above, the light provided to the diffusion pattern 227a through the light guide surface 226 is refracted by the spheroidal particles CB, and the refracted light may be reflected by the reflecting plate 240 or be provided to the light guide surface 226 to be emitted outward from the light emitting surface 224 of the light guide plate 220a.

In FIG. 4, the light incident to the porous particle DP1 from the light source module 210 is represented as "L1" and the "L1" is referred to as "incident light." For example, the incident light L1 is incident to the diffusion pattern 227a after propagating through the light incident surface 222 from the light source module 210 into the light guide plate 220a.

Referring to FIGS. 2 and 4, when the incident light L1 is incident to the porous particle DP1, the incident light L1 first diffuses on the surface SF of the porous particle DP1. For example, a light path of the incident light L1 changes into a first scattered light L21, a second scattered light L22 and a third scattered light L23. Although the incident light L1 is a single light ray, the incident light L1 is scattered by the fine embossed pattern of pores OP into a plurality of light paths such as the first, second and third scattered lights L21, L22 and L23. Thus, each of the first, second and third scattered lights L21, L22 and L23 propagates through the porous particle DP1 so that the first, second and third scattered lights L21, L22 and L23 are propagated to different portions of the surface SF. Each of the first, second and third scattered lights L21, L22 and L23 is a single light ray and each has a different light path. Even though the incident light L1 depicted in FIG. 4 is shown as changing into the first, second and third scattered lights L21, L22 and L23, in general the incident light L1 will be changed into at least two scattered lights based on the shape of the fine embossed pattern of the surface SF. Each of the at least two scattered lights has a single light path.

Each of the first, second and third scattered lights L21, L22 and L23 is scattered again by the surface SF. For example, the first scattered light L21 is scattered by the surface SF into first emitted light L211, a second emitted light L212 and a third emitted light L213, each having different light paths. In addition, the second scattered light L22 is scattered by the surface SF into a fourth emitted light L221, a fifth emitted light L222 and a sixth emitted light L223, each having different light paths. Furthermore, the third scattered light L23 is scattered by the surface SF into seventh emitted light L231 and a eighth emitted light L232 with different light paths. Each of the first to eighth emitted lights L211, L212, L213, L221, L222, L223, L231 and L232 have different light paths. Although each of the first to third lights L21, L22 and L23 had single path, the first to third scattered lights L21, L22 and L23 are scattered into multiple light paths because of the pores OP formed on the surfaces SF of the porous particles DP1. Alternatively, each of the first to third scattered lights L21, L22 and L23 may be scattered into single light paths, of which at least two may differ from each other, based on a shape of an embossed pattern on the surface SF.

According to the above, each light path incident on the outer surface of the porous particle DP1, will, after passing through the porous particle DP1, be split into at least two different light paths. Thus, compared to the spheroidal particle CB, in which a single light path incident on spheroidal particle CB changes into a different light path as it passes through the spheroidal particle CB, a single light path incident on the porous particle DP1 is split into at least two different light pathways as the light propagates through the porous particle DP1, enhancing the scattering properties of the diffusion pattern 227a.

When there are more spheroidal particles CB in the diffusion pattern 227a than porous particles DP1, more light is refracted by the spheroidal particles CB than is scattered by the porous particles DP1. If an insufficient amount of light is scattered by the porous particle DP1, color differences may result. In addition, if the diffusion pattern 227a only includes porous particles DP1, the light scattering by the porous particle DP1 may substantially uncontrollable, which can deteriorate brightness uniformity and the light-scattering properties. Therefore, in some embodiments, a weight ratio of the porous particles DP1 to the spheroidal particles CB in the diffusion pattern 227a may be between about 1:1 and about 9:1. In other embodiments, the weight ratio of the porous particles DP1 to the spheroidal particles CB in the diffusion pattern 227a may be between about 1:1 and about 4:1.

In the diffusion pattern 227a, when a total amount of the porous particles DP1 and the spheroidal particles CB is less than about 5% by weight with respect to a total weight of the diffusion pattern 227a, the light passing through the diffusion pattern 227a may be insufficiently diffused and scattered. Therefore, the total amount of the porous particles DP1 and the spheroidal particles CB may be greater than about 5% by weight with respect to the total weight of the diffusion pattern 227a. Increasing the total amount of the porous particles DP1 and the spheroidal particles CB in the diffusion pattern 227a enhances the light-diffusing and the light-scattering properties of the diffusion pattern 227a with respect to the light passing therethrough. However, if the total amount of the porous particles DP1 and the spheroidal particle CB exceeds about 35% by weight of the total weight of the diffusion pattern 227a, the amount of the binder resin AR may be insufficient to adequately fix the porous particles DP1 and the spheroidal particles CB on the light guide surface 226. Therefore, the total amount of the porous particles DP1 and the spheroidal particles CB may be between about 5% by weight and about 35% by weight of the total weight of the diffusion pattern 227a.

The binder resin AR fixes the porous particles DP1 and the spheroidal particles CB on the light guide surface 226. An example of a material that may be used for the binder resin AR may include an acrylic resin. For example, the binder resin AR may include poly methyl methacrylate (PMMA).

When an amount of the binder resin AR is less than about 65% by weight of the total weight of the diffusion pattern 227a, the porous particles DP1 and the spheroidal particles CB may be insufficiently fixed on the light guide surface 226. In addition, when the amount of the binder resin is greater than about 95% by weight of the total weight of the diffusion pattern 227a, the total amount of the porous particles DP1 and the spheroidal particles CB in the diffusion pattern 227a may be too small to adequately scatter and refract the light received from the light source module 210. Therefore, in some embodiments, the amount of the binder resin AR may be between about 65% by weight and about 95% by weight. In other embodiments, the binder resin AR may be between about 70% by weight and about 80% by weight.

Figure 5:
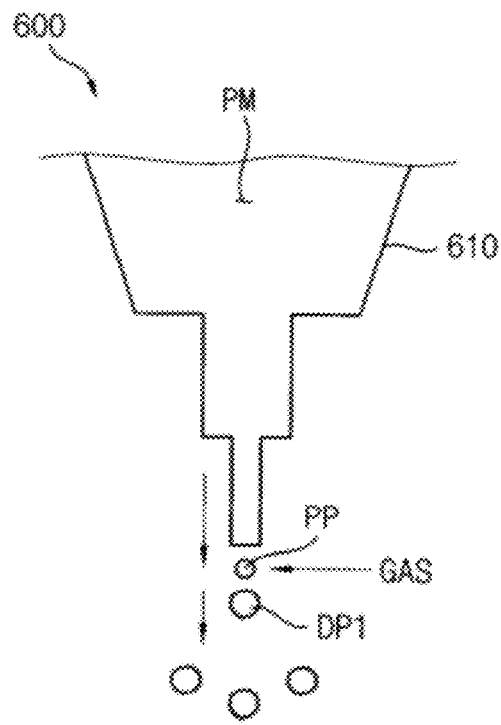
FIG. 5 illustrates a method of forming the porous particle shown in FIG. 2.

FIG. 5 illustrates a method of forming the porous particle shown in FIG. 2.

Referring to FIG. 5, a raw material PM of the porous particles DP1 is provided to a raw material tank 610 of a manufacturing apparatus 600, and the raw material PM is sprayed from the raw material tank 610. A gas GAS is provided to raw material droplets PP sprayed from the manufacturing apparatus 600 in a pyrolysis process to form the porous particles DP1. The raw material PM includes a silica precursor solution for forming the porous particles DP1.

If the gas GAS is not provided to the droplets PP, the spheroidal particles CB are formed from the droplet PP. When the gas GAS is provided to the droplet PP, the pores OP are formed in the inside or on the surface SF of the spherically shaped bodies 10 to form the porous particles DP1. A method such as that shown by FIG. 5 for forming the porous particles DP1 is exemplary and non-limiting, and the porous particles DP1 may be formed using other methods, such as gas phase synthesis, coagulation sedimentation or gas condensation.

Figure 6:
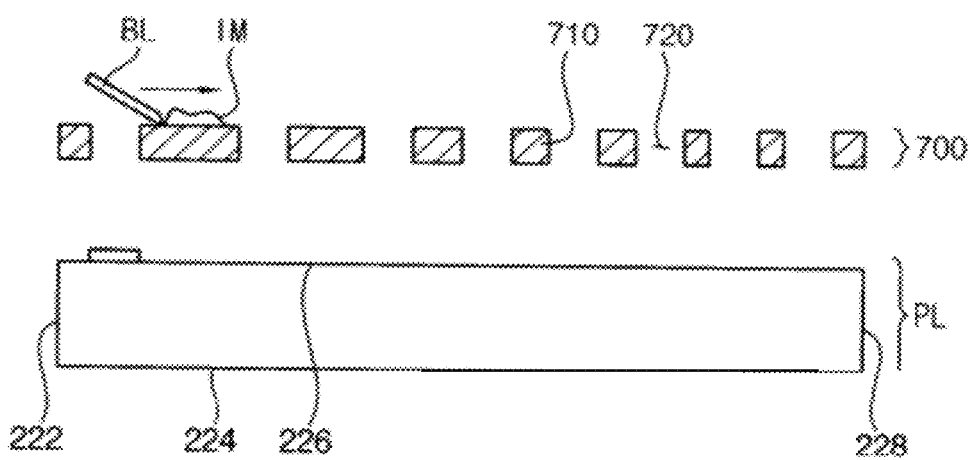
FIG. 6 is a cross-sectional view illustrating a method of manufacturing a light guide plate shown in FIG. 1.

FIG. 6 is a cross-sectional view illustrating a method of manufacturing the light guide plate shown in FIG. 1.

Referring to FIG. 6, an optical plate PL is provided to form the light guide plate 220a. The optical plate PL has a hexahedron structure defined by six surfaces. The optical plate PL is substantially the same as the light guide plate 220a having the light incident surface 222, the light emitting surface 224, the light guide surface 226 and the opposite surface 228 except for the diffusion pattern 227a. The diffusion pattern 227a is formed on the optical plate PL to be the light guide plate 220a. Of the six surfaces of the optical plate PL, the surface on which the diffusion pattern 227a is formed becomes the light guide surface 226. When the light guide surface 226 is so defined, each other surface of the light guide plate 220a is relatively defined.

After a stencil mask 700 is disposed on the optical plate PL, ink IM for forming the diffusion pattern 227a is dropped into regions of the stencil 700, and the ink IM dropped on the stencil 700 is uniformly and entirely spread on the stencil 700 using a roller BL. The ink IM includes the porous particles DP1, the spheroidal particles CB, and the binder resin AR. The binder resin AR included in the ink IM may be in a liquid phase before being cured.

The ink IM may include about 1% by weight to about 28% by weight of the porous particles DP1, about 4% by weight to about 17.5% by weight of the spheroidal particles CB, and about 65% by weight to about 95% by weight of the binder resin AR, considering the weight ratio of the porous particles DP1 to the spheroidal particles CB and the content range of the binder resin AR. For example, the ink IM may include about 16% by weight of the porous particles DP1, about 4% by weight of the spheroidal particles CB, and about 80% by weight of the binder resin AR. Alternatively, the ink IM may include about 20% by weight of the porous particles DP1, about 20% by weight of the spheroidal particles CB, and about 60% by weight of the binder resin AR.

The stencil 700 includes blocking portions 710 and opening portions 720. The ink IM is provided to the optical plate PL through the opening portions 720, and is blocked from being transferred to the optical plate PL by the blocking portions 710, so that spaced apart diffusion patterns 227a may be formed. Accordingly, the light guide plate 220a as illustrated in FIGS. 1 and 2 is manufactured.

According to a present exemplary embodiment, the diffusion pattern 227a including the porous particles DP1 and the spheroidal particles CB is formed on the light guide surface 226 of the light guide plate 220a, to provide and enhance a light scattering effect of the diffusion pattern 227a. When a comparative diffusion pattern includes only the spheroidal particles CB, the scattering effect is less than a diffusion pattern according to a present exemplary embodiment, decreasing brightness. In addition, when a comparative diffusion pattern includes the spheroidal particles CB and titanium dioxide particles, which have a higher refractive index than the spheroidal particles CB, color differences may be generated by the titanium dioxide particles due to their higher light absorption of blue wavelengths, although brightness may be enhanced.

However, a diffusion pattern 227a according to a present exemplary embodiment includes both porous particles DP1 and spheroidal particles CB to minimize light absorption in the blue wavelengths and to maximize light scattering. Therefore, the brightness may be enhanced and color differences may be minimized, improving a display quality of the display apparatus.

Figure 7:
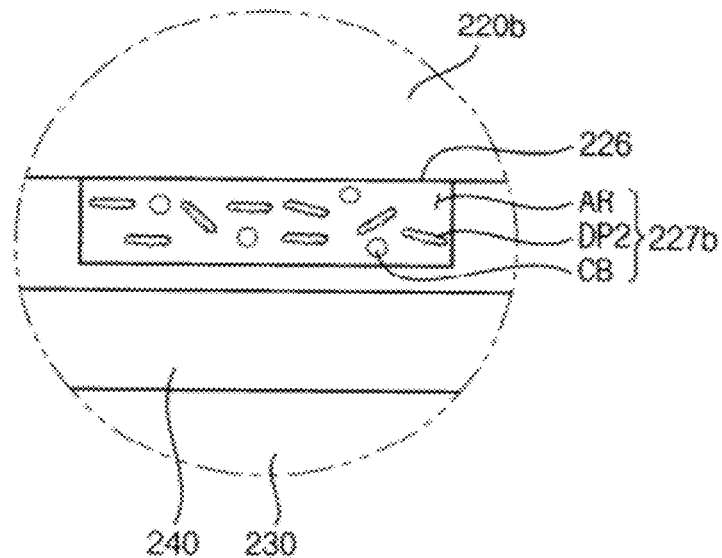
FIG. 7 is an enlarged cross-sectional view illustrating a diffusion pattern of a light guide plate according to another exemplary embodiment of the present disclosure.

FIG. 7 is an enlarged cross-sectional view illustrating a diffusion pattern of a light guide plate according to another exemplary embodiment of the present disclosure.

A light-emitting assembly including a light guide plate 220b according to a present exemplary embodiment of FIG. 7 is substantially the same as the light-emitting assembly according to a previous exemplary embodiment of FIG. 1 except for the light guide plate 220b. In addition, the light guide plate 220b according to a present exemplary embodiment of FIG. 7 is substantially the same as the light guide plate 220a according to a previous exemplary embodiment of FIG. 1 except for a diffusion pattern 227b. Furthermore, the diffusion pattern 227b according to a present exemplary embodiment in FIG. 7 is substantially the same as a previous exemplary embodiment of FIG. 1 except for the porous particles DP2. Thus, any further repetitive description will be omitted.

Referring to FIGS. 1 and 7, the diffusion pattern 227b formed on a light guide surface 226 of the light guide plate 220b includes porous particles DP2, spheroidal particles CB and a binder resin AR. The diffusion pattern 227b is disposed between the light guide surface 226 and the reflecting plate 240 disposed on the container 230.

The porous particles DP2 are silica particles including pores formed on a surface of or in the body of the porous particles DP2. The diffusion pattern 227b includes the porous particles DP2 with the spheroidal particles CB to enhance the light diffusing and light scattering properties of the diffusion pattern 227b. Alternatively, the porous particles DP2 may be plate shaped. The porous particles DP2 according to a present exemplary embodiment are substantially the same as the porous particles DP1 illustrated in FIGS. 2 to 4 except for being plate shapes. Thus, any further repetitive description with respect to light pathways will be omitted.

In some embodiments, a weight ratio of the porous particles DP2 to the spheroidal particles CB may be between about 1:1 and about 9:1. In other embodiments, the weight ratio of the porous particles DP2 to the spheroidal particles CB may be between about 1:1 and about 4:1.

Since the porous particles DP2 are plate shaped, they have a larger surface area for scattering light, enhancing the light diffusing and light scattering properties of the diffusion pattern 227b.

Figure 8:
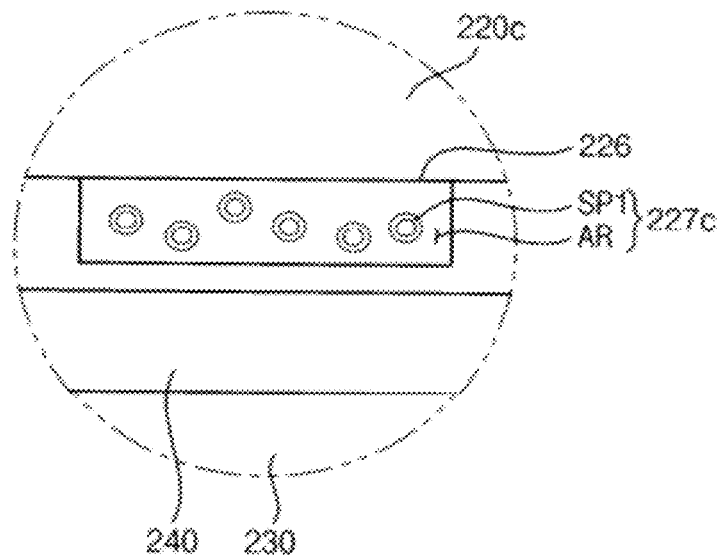
FIG. 8 is an enlarged cross-sectional view illustrating a diffusion pattern of a light guide plate according to still another exemplary embodiment of the present disclosure.

FIG. 8 is an enlarged cross-sectional view illustrating a diffusion pattern of a light guide plate according to another exemplary embodiment of the present disclosure.

A light-emitting assembly including a light guide plate 220c according to a present exemplary embodiment of FIG. 8 is substantially the same as the light-emitting assembly according to a previous exemplary embodiment of FIG. 1 except for the light guide plate 220c. In addition, the light guide plate 220c according to a present exemplary embodiment of FIG. 8 is substantially the same as the light guide plate 220a according to a previous exemplary embodiment of FIG. 1 except for a diffusion pattern 227c. Thus, any further repetitive description will be omitted.

Referring to FIGS. 1 and 8, the diffusion pattern 227c formed on a light guide surface 226 of the light guide plate 220c includes diffusion particles SP1 and a binder resin AR. The diffusion pattern 227c is disposed between the light guide surface 226 and the reflecting plate 240 disposed on the container 230.

The diffusion particles SP1 include silica. The diffusion particles SP1 have a hollow structure. The hollow structure may be defined by an empty space on the inside of the hollow structure. For example, the diffusion particles SP1 may have a toroidal shape with a hole penetrating a central portion of the body. An outer contour and an inner contour of a two-dimensional cross-sectional view of the body of the diffusion particle SP1 illustrated in FIG. 8 may have circular shapes. Alternatively, the outer contour and the inner contour of the two-dimensional cross-sectional view of the diffusion particle SP1 may have elliptical shapes.

Light incident on the diffusion particles SP1 propagates through the surface into the diffusion particles SP1, and the light inside the diffusion particles SP1 is firstly refracted by a first portion of the inner surface INF (shown in FIG. 9 for diffusion particles SP2, described below) defining an inner space. After the light refracted by the inner surface INF propagates to a different, second portion of the inner surface INF, the light incident to the second portion is secondly refracted by the second portion, propagating out of the diffusion particle SP1 through the outer surface of the body.

The diffusion particles SP1 in FIG. 8 having a hollow structure are formed using the raw material PM and an additional blowing agent, as illustrated in FIG. 5. The blowing agent forms the inner space in the body to provide the diffusion particles SP1 with the hollow structure.

A method for manufacturing the light guide plate 220c on which the diffusion pattern 227c having the diffusion particles SP1 is formed according to a present exemplary embodiment is substantially the same as a method for manufacturing the light guide plate 220a according to a previous exemplary embodiment of FIG. 6, except for the ink IM. In a method for manufacturing the light guide plate 220c, the ink for forming the diffusion pattern 227c includes the diffusion particles SP1 and a binder resin which is substantially the same as the binder resin AR included in the ink IM of FIG. 6. The ink for the diffusion pattern 227c may include about 20% by weight of the diffusion particles SP1 and about 80% by weight of the binder resin.

The light provided to the diffusion particles SP1 is refracted at least twice by the diffusion particles SP1 due to the hollow structure. Thus, as compared to the spheroidal particles CB, the diffusion particles SP1 changes the light incident to the diffusion particles SP1 into a plurality of different light paths, enhancing the brightness of the diffusion pattern 227c.

Alternatively, the diffusion pattern 227c may further include spheroidal particles CB shown in FIG. 2 to adjust the scattering effect of the diffusion pattern 227c. When the diffusion pattern 227c further includes the spheroidal particles CB, the weight ratio of the diffusion particles SP1 to the spheroidal particles CB may be between about 1:1 and about 9:1. For example, the diffusion pattern 227c may include about 16% by weight of the diffusion particles SP1, about 4% by weight of the spheroidal particles CB, and about 80% by weight of the binder resin.

Figure 9:
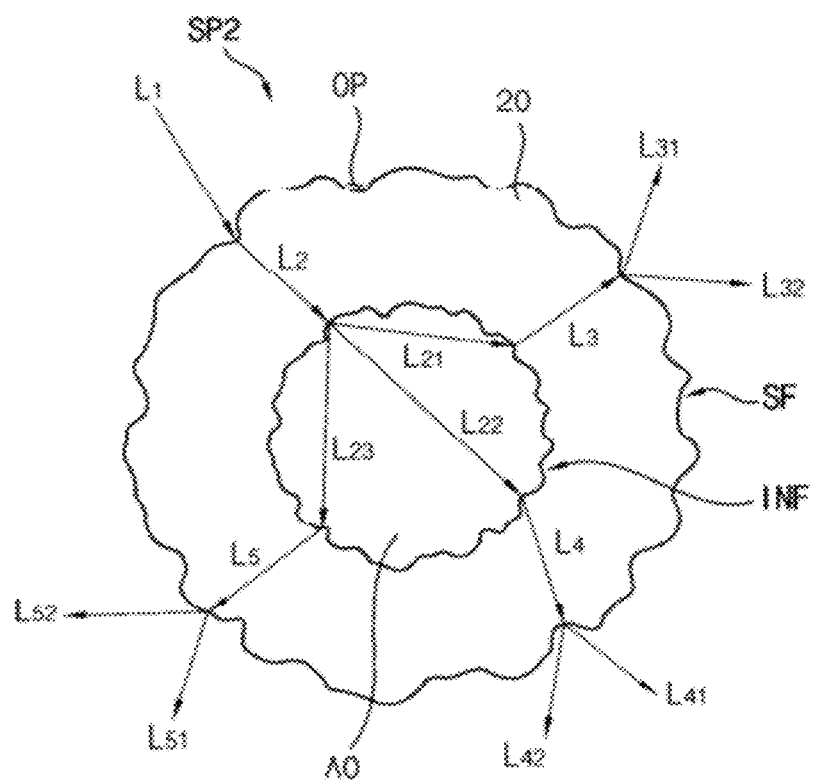
FIG. 9 is an enlarged cross-sectional view illustrating a diffusion particle which is included in a diffusion pattern of a light guide plate according to still another exemplary embodiment of the present disclosure.

FIG. 9 is an enlarged cross-sectional view illustrating a diffusion particle included in a diffusion pattern of a light guide plate according to still another exemplary embodiment of the present disclosure.

A diffusion particle SP2 in FIG. 9 includes silica. The diffusion particle SP2 has a hollow structure including an empty inner space AO inside of a body 20 of the diffusion particle SP2. The diffusion particle SP2 includes a plurality pores OP formed on a surface SF of the body 20 and/or an inner surface INF defining the inner space AO.

In FIG. 9, light incident to the diffusion particle SP2 is represented as "L1" and the "L1" is referred to as "incident light." The incident light L1 is incident to the diffusion particle SP2, and is then firstly scattered by the surface SF of the diffusion particle SP2. For example, a light path of the incident light L1 changes into initially scattered light L2. Each of the incident light L1 and the initially scattered light L2 is a single light path. The incident light L1 is scattered by the fine embossed pattern of pores OP formed on the surface SF of the diffusion particles SP2 into the initially scattered light L2.

When the incident light L1 is incident to the diffusion particle SP2, the initially scattered light L2 is incident to the inner surface INF after propagating through the body 20. The initially scattered light L2 is secondly scattered on the inner surface INF and the light path changes into a first scattered light L21, a second scattered light L22 and a third scattered light L23, due to the pores OP formed on the inner surface INF. Thus, the first, second and third scattered lights L21, L22 and L23 propagate to different regions of the inner surface INF. Each of the first, second and third scattered lights L21, L22 and L23 has a different, single light path.

Each of the first, second and third scattered lights L21, L22 and L23 is thirdly scattered on the inner surface INF. The thirdly scattered light may be fourthly scattered on the surface SF to propagate out of the diffusion particle SP2.

For example, after the first scattered light L21 is thirdly scattered into a first straight light L3, the first straight light L3 may fourthly scattered by the surface SF into a first emitted light L31 and a second emitted light L32, each having a different light path. In addition, after the second scattered light L22 is thirdly scattered into a second straight light L4, the second straight light L4 may be fourthly scattered by the surface SF into a third emitted light L41 and a fourth emitted light L42, each having a different light path. Furthermore, after the third scattered light L23 is thirdly scattered into a third straight light L5, the third straight light L5 may be fourthly scattered by the surface SF into a fifth emitted light L51 and a sixth emitted light L52, each having a different light path. Alternatively, each of the first, second and third scattered light L21, L22 and L23 may be scattered into single light paths, of which at least two may differ from each other, due to the shape of the fine embossed pattern, and the single light paths may propagate out of the diffusion particle SP2.

According to a present exemplary embodiment, the light exiting out of the diffusion particles SP2 have at least two different light paths, even though the incident light L1 is incident to the diffusion particle SP2 as a single straight light. Thus, when a diffusion particle SP2 is compared to a spheroidal particle CB of FIG. 2, a single straight light incident to the spheroidal particle CB may have one light pathway after propagating through the spheroidal particle CB. However, a single straight light incident to the diffusion particle SP2 propagates through the diffusion particle SP2 to exit out of the diffusion particle SP2 with a plurality of straight lights having different light paths, and thus enhancing the light light-scattering properties of the diffusion pattern 227c.

The diffusion particles SP2 illustrated in FIG. 9 may be included in a diffusion pattern of a light guide plate with a binder resin. Alternatively, the diffusion particles SP2 may be included in a diffusion pattern with the binder resin and at least one of the first porous particles DP1 illustrated in FIGS. 2 and 3, the second porous particles DP2 illustrated in FIG. 7, or the diffusion particles SP1 illustrated in FIG. 8. Alternatively, the diffusion particles SP2 may be included in a diffusion pattern with the spheroidal particles CB illustrated in FIG. 2 and the binder resin. For example, the diffusion pattern may include the diffusion particles SP2 and the spheroidal particles CB with the weight ratio of between about 1:1 and about 9:1.

According to a present exemplary embodiment, the diffusion pattern of the light guide plate includes the diffusion particles SP2 to enhance the light light-scattering properties and minimize the generation of color differences, improving the display quality of a display apparatus.

Figure 10:
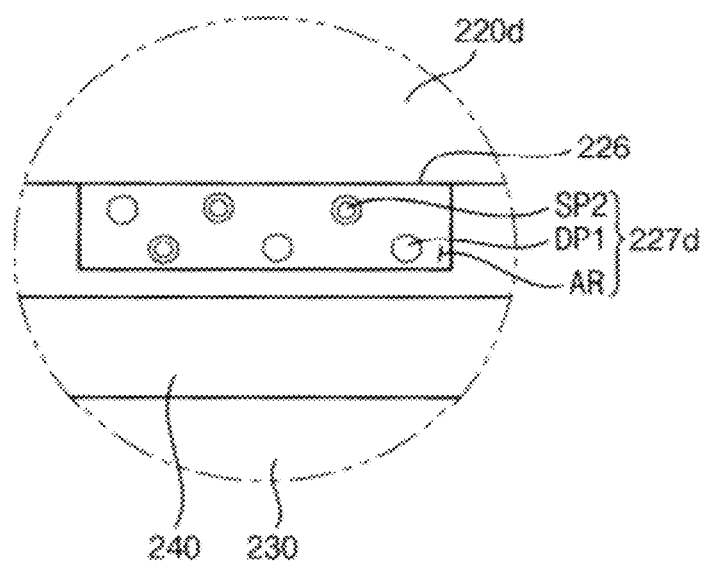
FIG. 10 is an enlarged cross-sectional view illustrating a diffusion pattern of a light guide plate according to still another exemplary embodiment of the present disclosure.

FIG. 10 is an enlarged cross-sectional view illustrating a diffusion pattern of a light guide plate according to still another exemplary embodiment of the present disclosure.

A light-emitting assembly including a light guide plate according to a present exemplary embodiment of FIG. 10 is substantially the same as the light-emitting assembly according to a previous exemplary embodiment of FIG. 1, except for the light guide plate. In addition, the light guide plate 220d according to a present exemplary embodiment of FIG. 10 is substantially the same as a light guide plate according to a previous exemplary embodiment of FIG. 1, except for a diffusion pattern 227d. Thus, any repetitive descriptions will be omitted.

Referring to FIGS. 1 and 10, the light guide plate 220d includes the diffusion pattern 227d formed on the light guide surface 226. The diffusion pattern 227d includes porous particles DP1 and diffusion particles SP2. The diffusion pattern 227d further includes a binder resin AR. The porous particles DP1 of the diffusion pattern 227d are substantially the same as the porous particles DP1 illustrated in FIGS. 2 and 3, and the diffusion particles SP2 are substantially the same as the diffusion particles SP2 illustrated in FIG. 9. Thus, any further repetitive descriptions will be omitted.

A total amount of the porous particles DP1 and the diffusion particles SP2 may be between about 5% by weight and about 35% by weight with respect to a total weight of the diffusion pattern 227d. A weight ratio of the porous particles DP1 and the diffusion particles SP2 may be between about 1:9 and about 9:1. The diffusion pattern 227d includes both the porous particles DP1 and the diffusion particles SP2 to enhance its light-diffusing properties.

According to a present exemplary embodiment, the diffusion pattern 227d may be formed by using the porous particles DP1 and the diffusion particles SP2 to enhance its light-diffusing properties and minimize the generation of the color differences, thus improving a display quality of a display apparatus.

Alternatively, the diffusion pattern 227d may include the diffusion particles SP1 of FIG. 8 instead of the diffusion particles SP2 of FIG. 9. In addition, the diffusion pattern 227d may include the porous particles DP2 of FIG. 7 instead of the porous particles DP1 of FIGS. 2 and 3.

Hereinafter, the brightness properties and the color coordinates of a light guide plate according to a present disclosure will be explained referring to FIGS. 11 and 12.

First, the following three inks for forming a diffusion pattern were prepared.

Porous particles having spherically shaped bodies and spheroidal particles were prepared. The porous particles included silica and pores formed on the surfaces of the bodies and had an average diameter between about 2 µm and about 4 µm. The spheroidal particles had an average diameter between about 2 µm and about 4 µm. About 14.4% by weight of the porous particles, about 3.6% by weight of the spheroidal particles, about 2% by weight of titanium dioxide particles having an average diameter between about 2 µm and about 4 µm, and about 80% by weight of PMMA were mixed to prepare a first ink, and then a diffusion pattern was formed by a screen printing process using the first ink on an optical plate to manufacture a first light guide plate.

In addition, about 9.5% by weight of the porous particles, about 9.5% by weight of the spheroidal particles, about 1% by weight of the titanium dioxide particles, and about 80% by weight of PMMA were mixed to prepare a second ink, and then a diffusion pattern was formed by a screen printing process using the second ink on an optical plate to manufacture a second light guide plate.

Furthermore, about 16% by weight of the porous particles, about 4% by weight of the spheroidal particles, and about 80% by weight of PMMA were mixed to prepare a third ink, and a diffusion pattern was formed by a screen printing process using the third ink on an optical plate to manufacture a third light guide plate.

The brightness of each of the first, second and third light guide plates was measured, and a brightness of the first light guide plate were assumed to be about 100%. According to experimental results, the brightness of each of the second and third light guide plates was about 100% so that the brightness of the first light guide plate was substantially equal to that of each of the second and third guide plates. For example, the brightness of the third guide plate was substantially equal to the brightness of each of the first and second guide plates without using the titanium dioxide particles.

A color difference of each of the first, second and third light guide plates was calculated. According to experimental results, the color difference of the first light guide plate was about 0.012, and the color difference of the second light guide plate was about 0.008. In addition, the color difference of the third light guide plate was about 0.005. When the color differences were compared to each other, the color difference of the third light guide plate is lower than the color difference of each of the first and second light guide plates.

Figures 11, 12:
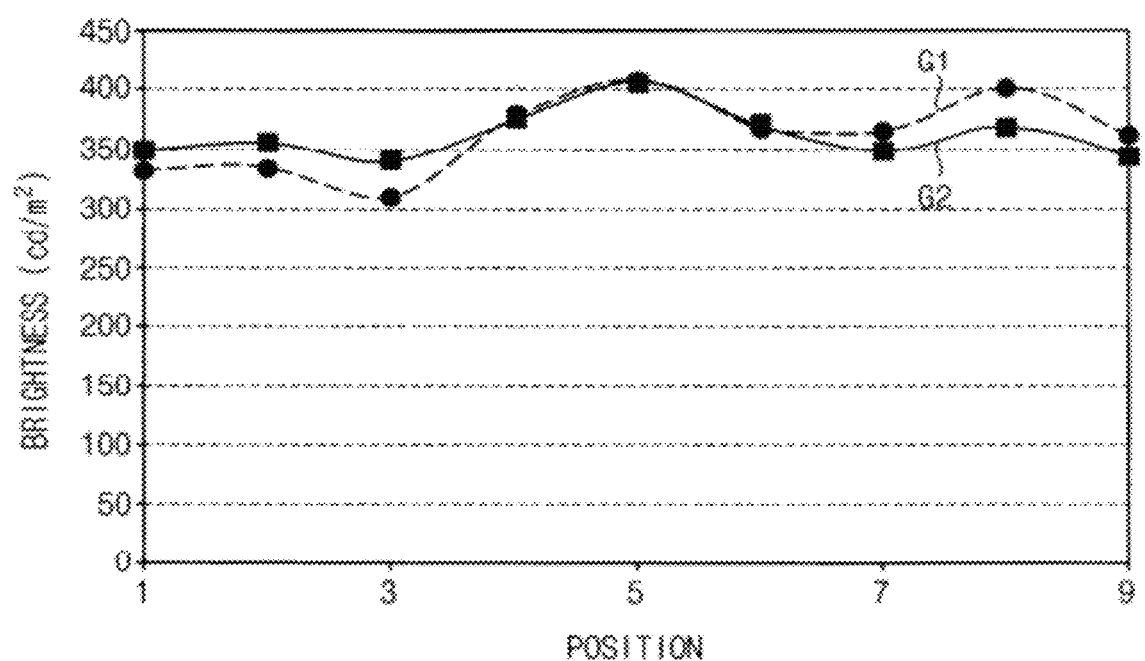
FIG. 11 is a plan view illustrating a measured position of a light guide plate in an experiment of measuring brightness uniformity.
FIG. 12 is a graph illustrating the brightness according to the measured position shown in FIG. 11.

FIG. 11 is a plan view illustrating a measured position of a light guide plate in an experiment of measuring brightness uniformity. An emitting surface of each of the first, second and third light guide plates was divided as nine imaginary regions as illustrated in FIG. 11, and the brightness of each of the nine imaginary regions was measured. The experimental results are illustrated in FIG. 12.

FIG. 12 is a graph illustrating the brightness according to the measured position shown in FIG. 11.

In FIG. 12, a graph "G1" represents a change of the brightness according to the measured position in the third light guide, and a graph "G2" represents a change of the brightness according to the measured position in the first light guide plate. Referring to FIG. 12, the brightness according to the measured position in the first light guide plate is substantially the same as that in the third light guide plate. For example, the brightness uniformity of the third light guide plate is substantially same as that of the first light guide plate. Thus, the third light guide plate has substantially the same brightness uniformity as the first light guide plate without using titanium dioxide particles.

According to a present exemplary embodiment, a diffusion pattern formed on a light guide surface of a light guide plate includes silica particles, but not titanium dioxide particles, to enhance brightness and brightness uniformity. In addition, the diffusion pattern may minimize generation of color differences, and may improve a display quality of a display apparatus.

The foregoing is illustrative of exemplary embodiments of the present disclosure and is not to be construed as limiting thereof. Although a few exemplary embodiments of the present disclosure have been described, those skilled in the art will readily appreciate that many modifications are possible in the exemplary embodiments without materially departing from the novel teachings of the present disclosure. Therefore, it is to be understood that the foregoing is illustrative of the present disclosure and is not to be construed as limited to the specific exemplary embodiments disclosed, and that modifications to the disclosed exemplary embodiments, as well as other exemplary embodiments, are intended to be included within the scope of the appended claims, with equivalents of the claims to be included therein.

What is claimed is:

1. A light guide plate comprising:
    a light incident surface for receiving an externally generated light;
    a light emitting surface for emitting outward the light received through the light incident surface; and
    a light guide surface facing the light emitting surface that includes a diffusion pattern formed thereon, the diffusion pattern including a plurality of porous particles and a plurality of spheroidal particles,
    wherein each of the porous particles has a body having pores formed therein and on surfaces of the body,
    wherein an embossed pattern is formed on the surfaces of the body and the embossed pattern is defined by the pores formed on the surfaces of the body,
    and wherein the porous particles and the spheroidal particles are formed inside the diffusion pattern.

2. The light guide plate of claim 1, wherein a weight ratio of the porous particles to the spheroidal particles is between about 1:1 and about 9:1.

3. The light guide plate of claim 1, wherein a total amount of the porous particles and the spheroidal particles with respect to a total weight of the diffusion pattern is between about 5% by weight and about 35% by weight.

4. The light guide plate of claim 3, wherein the diffusion pattern further comprises a binder resin fixing the porous particles and the spheroidal particles on the light guide surface, and
an amount of the binder resin with respect to the total weight of the diffusion pattern is between about 65% by weight and about 95% by weight.

5. The light guide plate of claim 1, wherein the body of the porous particle has one of a spherical shape or a plate shape.

6. The light guide plate of claim 1, wherein the diffusion pattern further comprises a plurality of diffusion particles therein, and
each of the diffusion particles has a body having a hollow structure with an inside empty space therein.

7. The light guide plate of claim 6, wherein the diffusion particles each have a plurality of pores formed on inner and outer surfaces thereof.

8. A light guide plate comprising:
a light incident surface for receiving light from an external source;
a light emitting surface for emitting outward the light received through the light incident surface; and
a light guide surface facing the light emitting surface that includes a diffusion pattern formed thereon, the diffusion pattern including a plurality of diffusion particles wherein
each of the diffusion particles has a body having a hollow structure with an inside empty space therein, and a plurality of pores formed on inner and outer surfaces of the body,
wherein embossed patterns are formed on the inner and outer surfaces of the body and the embossed patterns are defined by the pores formed on the inner and outer surfaces of the body, respectively, and
wherein the diffusion particles are formed inside the diffusion pattern.

9. The light guide plate of claim 8, wherein the diffusion pattern further comprises a plurality of spheroidal particles.

10. The light guide plate of claim 9, wherein a weight ratio of the diffusion particles to the spheroidal particles with respect to the total weight of the diffusion pattern is between about 1:1 and about 9:1.

11. The light guide plate of claim 10, wherein a total amount of the diffusion particle and the spheroidal particles with respect to a total weight of the diffusion pattern is between about 5% by weight and about 35% by weight.

12. The light guide plate of claim 8, wherein the diffusion pattern further comprises a binder resin fixing the diffusion particles on the light guide surface, and
an amount of the binder resin with respect to a total weight of the diffusion pattern is between about 75% by weight and about 95% by weight.

13. A light-emitting assembly comprising:
a light source for generating light; and
a light guide plate including a light incident surface, a light emitting surface, and a light guide surface facing the light emitting surface and including a diffusion pattern formed thereon, the light incident surface receiving the light from the light source, the light emitting surface emitting outward the light received through the light incident surface, the diffusing pattern including a plurality of porous particles and a plurality of spheroidal particles,
wherein each of the porous particles has a body having pores formed therein and on surfaces of the body,
wherein an embossed pattern is formed on the surfaces of the body and the embossed pattern is defined by the pores formed on the surfaces of the body, and
wherein the porous particles and the spheroidal particles are formed inside the diffusion pattern.

14. The light-emitting assembly of claim 13, wherein the light source includes light emitting diodes (LED).

15. The light-emitting assembly of claim 13, wherein a weight ratio of the porous particles and the spheroidal particles with respect to a total weight of the diffusion pattern is between about 1:1 and about 9:1.

16. The light-emitting assembly of claim 13, wherein the diffusing pattern further comprises a plurality of diffusion particles therein, and
each of the diffusion particles has a body having a hollow structure with an inside empty space therein.

17. A light-emitting assembly comprising:
a light source for generating light; and
a light guide plate including a light incident surface, a light emitting surface, and a light guide surface facing the light emitting surface and including a diffusion pattern formed thereon, the light incident surface receiving the light from the light source, the light emitting surface emitting outward the light received through the light incident surface, the diffusion pattern including a plurality of diffusion particles, wherein
each of the diffusion particles has a body having a hollow structure with an inside empty space therein, and a plurality of pores formed on inner and outer surfaces of the body,
wherein embossed patterns are formed on the inner and outer surfaces of the body and the embossed patterns are defined by the pores formed on the inner and outer surfaces of the body, respectively, and
wherein the diffusion particles are formed inside the diffusion pattern.

18. The light-emitting assembly of claim 17, wherein the light source comprises a plurality of light emitting diodes (LED).

19. The light-emitting assembly of claim 17, wherein the diffusion pattern further comprises a plurality of spheroidal particles.

* * * * *